United States Patent
Pulli et al.

(10) Patent No.: US 7,751,927 B2
(45) Date of Patent: Jul. 6, 2010

(54) METHOD AND APPARATUS FOR AUTOMATIC LOADING OF DUMPER

(75) Inventors: Riku Pulli, Tampere (FI); Jari Jasu, Pōyīyā (FI); Janne Kallio, Turku (FI)

(73) Assignee: Sandvik Mining and Construction OY, Tampere (FI)

( * ) Notice: Subject to any disclaimer, the term of this patent is extended or adjusted under 35 U.S.C. 154(b) by 453 days.

(21) Appl. No.: 10/686,681

(22) Filed: Oct. 17, 2003

(65) Prior Publication Data

US 2004/0136816 A1  Jul. 15, 2004

Related U.S. Application Data

(63) Continuation of application No. PCT/FI02/00317, filed on Apr. 15, 2002.

(30) Foreign Application Priority Data

Apr. 17, 2001  (FI)  ................. 20010790

(51) Int. Cl.
 *G06F 7/00* (2006.01)
(52) U.S. Cl. ........................ 700/213; 414/340
(58) Field of Classification Search ............. 700/213; 414/340, 341, 699; 37/414; 701/124
 See application file for complete search history.

(56) References Cited

U.S. PATENT DOCUMENTS

| | | | | | |
|---|---|---|---|---|---|
| 3,235,104 A | * | 2/1966 | Morawski et. al. | .......... | 414/329 |
| 3,666,119 A | * | 5/1972 | Parsons | .......... | 414/328 |
| 3,944,090 A | * | 3/1976 | Flood | .......... | 414/809 |
| 3,964,620 A | * | 6/1976 | Parsons | .......... | 414/289 |
| 4,460,308 A | * | 7/1984 | Moon et al. | .......... | 414/808 |
| 4,614,477 A | * | 9/1986 | Hagenbuch | .......... | 414/809 |
| 4,659,274 A | * | 4/1987 | France | .......... | 414/21 |
| 4,750,530 A | * | 6/1988 | Helle et al. | .......... | 141/1 |
| 5,575,316 A | * | 11/1996 | Pollklas | .......... | 141/198 |
| 5,749,783 A | * | 5/1998 | Pollklas | .......... | 460/119 |
| 5,881,780 A | * | 3/1999 | Matye et al. | .......... | 141/232 |
| 6,076,030 A | * | 6/2000 | Rowe | .......... | 701/50 |

(Continued)

FOREIGN PATENT DOCUMENTS

JP  6102930  4/1994

(Continued)

OTHER PUBLICATIONS

International Search Report dated Oct. 7, 2002.

*Primary Examiner*—Gene Crawford
*Assistant Examiner*—Ramya Prakasam
(74) *Attorney, Agent, or Firm*—Drinker Biddle & Reath LLP

(57) ABSTRACT

A method for loading a dumper with broken rock or the like and an apparatus for implementing the method. In the method, a loading area is defined for the dumper. The dumper is stopped at the loading area at a predefined position for loading. An emptying area is correspondingly defined in advance for a loader for transporting the material in its bucket onto the dumper box. The apparatus includes a controller for controlling the dumper at least during loading, and the controller includes means for stopping the dumper for loading at the predefined position so that the material transported by the loader can be emptied onto the dumper box in a predefined location in the longitudinal direction.

9 Claims, 2 Drawing Sheets

U.S. PATENT DOCUMENTS

| | | |
|---|---|---|
| 6,157,889 A | 12/2000 | Baker |
| 6,363,632 B1 * | 4/2002 | Stentz et al. .................. 37/414 |
| 6,442,456 B2 * | 8/2002 | Burns et al. .................. 701/23 |
| 6,739,078 B2 * | 5/2004 | Morley et al. ................. 37/348 |
| 6,943,824 B2 * | 9/2005 | Alexia et al. .................. 348/89 |

FOREIGN PATENT DOCUMENTS

| | | |
|---|---|---|
| JP | 6102930 A | 4/1994 |
| JP | 6298374 | 10/1994 |
| JP | 6298374 A | 10/1994 |
| SU | 695933 | 11/1979 |
| SU | 695933 A | 11/1979 |
| SU | 1173190 | 8/1985 |
| SU | 1173190 A | 8/1985 |

\* cited by examiner

METHOD AND APPARATUS FOR AUTOMATIC LOADING OF DUMPER

The present invention is a continuation of International Application No. PCT/FI02/00317, filed Apr. 15, 2002, the disclosure of which is hereby incorporated by reference.

BACKGROUND AND SUMMARY

The invention relates to a method and apparatus for loading a dumper with broken rock or corresponding material in such a manner that several bucketfuls of the material are loaded by a loader on a dump box in such a manner that the loader approaches the dumper transverse to it so that the material in the bucket of the loader can be emptied from the bucket to the dump box.

In mining or other quarrying operations, broken rock needs to be transported in different ways for further processing from the quarry to a processing site. Broken rock is typically first transported in loaders that fetch the broken rock and transport it to a loading site. Broken rock is transported on by dumpers, trains or the like that return to the loading site to fetch a new load. One typical transport method is that after fetching a bucketful of broken rock the loader empties it directly on the dump box. The dump box can typically take several bucketfuls, which means that when loading, the operator needs to empty the bucket at different points in both longitudinal and transverse direction of the dump box so as to fill the box as well as possible. Because the operator does not, however, see when the box is full, it is always to some extent unevenly filled, and the process difficult for the operator. The situation is the same when an autonomously moving dumper controlled by a computer is used, because the operator of the loader cannot see the inside of the box. New solutions are required, if a fully automated dumper loading is to be achieved, in which both the dumpers and loaders operate autonomously controlled by a computer.

It is an object of the present invention to provide a method and an apparatus, with which the loading of a dumper is easier and simpler than now and with which loading is more efficient than before.

The method of the invention is characterized in that the loading site has a predefined loading area, where the dumper is stopped in a predefined position for loading; that a predefined emptying area is defined for the loader in the loading area at the side of the dumper, to which the loader drives for the purpose of emptying the material in its bucket on the box of the dumper; that to fill the box of the dumper in the desired manner in transverse direction, the loader is stopped at different points transverse to the dumper, and thus longitudinal to the loader, according to the filling degree of the box and depending on the loading situation of the dump box area being loaded at the time; and that to load the dump box in its longitudinal direction in the desired manner, the dumper is moved, when one area of the box has been loaded, in longitudinal direction or the emptying area of the loader is moved in the longitudinal direction of the dumper a predefined distance so as to load the next area of the box.

Further, the apparatus of the invention is characterized in that it comprises control means for controlling the dumper at least during loading; that the control means comprise means for stopping the dumper in the loading area in a predefined position so that the material transported by the loader can be emptied on the dump box at a predefined point in its longitudinal direction and, when the dump box is loaded at a certain longitudinal point of the box, for moving the dumper in longitudinal direction or for moving the emptying area of the loader in the longitudinal direction of the dumper a predefined distance so as to load the next area of the box.

An essential idea of the invention is that the dumper is most preferably stopped automatically in a specific predefined loading area, to which the loader in turn transports a load along a specific route that is transverse to the direction of travel of the dumper to a predefined emptying area at the side of the dumper and empties its bucket on the dump box at different points in the transverse direction of the dump box depending on the loading situation. This way, the filling of the box is controlled in its transverse direction by driving the loader either further away from the dumper or closer to it depending on which side of the box the load is to be emptied. A further essential idea of the invention is that during loading, the dumper is moved most preferably automatically in its longitudinal direction in a manner suitable for the loading so that the load emptied from the loader drops on the dump box at a suitable point in its longitudinal direction, in which case the longitudinal filling of the box is correspondingly controlled by moving the dumper to a suitable point. This way, the dump box can be appropriately filled by controlling the filling of the box in the longitudinal direction of the dumper by means of the longitudinal position of the dumper and in the transverse direction by means of the longitudinal position of the loader. The essential idea of a preferred embodiment of the invention is that it comprises separate measuring means for measuring the amount of load on the dump box: height, weight, etc., and for controlling the loading on the basis of the measurements in such a manner that when the amount of the load on the dump box at the current loading point exceeds a predefined value, the dumper is moved in its longitudinal direction or the emptying area of the loader is moved in the longitudinal direction of the dumper so that the next load brought by the loader drops at an emptier point of the box, or if the entire box is full, the dumper leaves to empty the box most preferably automatically controlled by a computer. According to a second preferred embodiment of the invention, the loading site is such that in a loading situation, the dumper is substantially lower than the loader, preferably below the loading area of the loader. According to yet another preferred embodiment of the invention, the loading site has a funnel-shaped guide located above the dump box in the loading situation so that the broken rock from the bucket of the loader drops entirely inside the dump box.

The invention provides the advantage that with the use of an automatically controlled dumper, loading can be automated and controlled easily so that the load transported by the loader always drops on a suitable area of the box so as to have a sufficiently high load in the dumper suitably distributed on the entire box. In fully automated loading, where both the loader and the dumper operate automatically under the control of a computer, the control and guidance of loading is simple and easy, because the longitudinal filling of the box is most preferably controlled by moving the dumper and, correspondingly, the transverse filling is controlled by guiding the movement of the loader in its longitudinal direction, which makes the control simple and easy. This, in turn, is based on the fact that it is necessary to control only the movement and length of movement of either machine in one direction and complex and difficult two-dimensional movement control is not needed.

BRIEF DESCRIPTION OF THE DRAWINGS

The invention will be described in greater detail in the attached drawings, in which.

DETAILED DESCRIPTION

Figure 1:
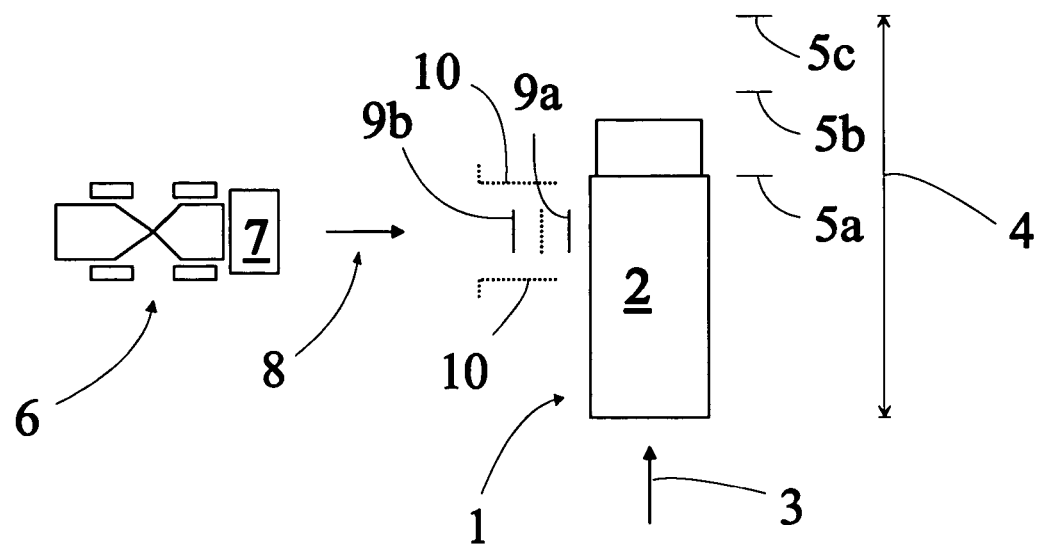
FIG. 1 is a schematic top view of loading material with a loader to a dumper by applying the method of the invention.

FIG. 1 shows a dumper 1 that runs automatically under the control of a computer and has a box 2 for transporting a load, in this case broken rock. The dumper moves along the route marked by arrow 3, for instance, and stops in the loading area shown by arrow 4 in the manner indicated in the figure, i.e. where the loading area 4 begins, so that the front edge of the box 2 is at the location shown by line 5a. When the dumper is at this location, a loader 6 having a bucket 7 arrives as shown by arrow 8 to empty the material, such as broken rock, in the bucket 7 onto the box 2 of the dumper 1. So as to be able to load the box in a desired manner, an emptying area is defined for the loader 6 in the loading area in the longitudinal direction of the dumper, to which the loader 6 drives when transporting material for the dump box. So as to fill the box 2 in a suitable manner, the front edge of the loader or some other measurement or comparison point is driven substantially perpendicular to the transverse direction of the box 2 until the level shown by line 9a, for instance, so that when the bucket 7 is tipped, the broken rock falls over the centreline of the box 2 to the right-hand side in the figure. Correspondingly, when transporting the next bucketful, the loader stops at the location shown by line 9b, in which case the broken rock in the bucket 7 falls to the left-hand side of the box 2 in the figure. This way, an even load is achieved in transverse direction at a given location in the longitudinal direction of the box. If the box volume and load-bearing capacity of the dumper permits, it is also possible to use for instance the location marked with a dashed line midway between lines 9a and 9b for emptying the bucket load of the loader in the middle of the dump box in its transverse direction. The marked locations, such as lines 9a and 9b, can naturally also be defined otherwise in relation to the loader, for instance at the wheels or at the back end, as long as the stopping points of the loader in the transverse direction of the dumper are explicitly defined and detectable so the loader can be guided according to them. The detection can be done for instance by using a suitable distance gauge or the like at the front end of the loader to measure the location of the loader in relation to the loading area of the dumper and thus also to the dumper in its transverse direction. Depending on the size of the loader bucket and the dump box, which affects the number of bucketfuls the loader can transport to one location in its transverse direction, it is possible to define in advance more than one emptying area for the bucket, and their locations are naturally selected in accordance with the equipment being used. After the front section of the box is filled while the dumper is in the position according to the figure, the dumper is moved forward until the front edge of the box 2 is approximately at line 5b. Correspondingly, the box is here filled in transverse direction in the same manner as at line 5a and further, if the length of the box is such that its loading requires three consecutive loading points, the dumper is run forward until the front edge of the box is at line 5c and the loading in transverse direction is done according to the earlier description. When the dump box 2 is full, the computer sends a notification or fully automatically directs the dumper along a defined route to empty its load and to return to be reloaded in the manner shown in FIG. 1. The situation of FIG. 1 shows one dumper and one loader to simplify the matter. In practice, several loaders may load one dumper, which is more efficient, and correspondingly, when one dumper leaves the loading site to empty its load, a second dumper can drive immediately after it to the site to be loaded so that loading is substantially continuous for both dumpers and loaders without any breaks that would reduce output.

In the situation shown in FIG. 1, the dumper and loader can, in principle, be level with each other, because the bucket of the loader extends above the edges of the dump box. If the loader is manually controlled, positioning it is easier when using controls, which are indicated by dashed lines 10 in the figure, either marked in the body or made up of separate control posts or other controls so as to allow the correct positioning of the loader in the emptying area in relation to the longitudinal position of the dumper. So as to maintain a suitable amount, i.e. in practice height, of load in the dumper, the load of the dumper can be monitored with separate measuring devices, by means of which the height and/or weight of the load on the box and preferably also the location of the load on the box and possibly its shape can be defined. This is described later in connection with the other figures, but on the basis of the information provided by such measuring devices, a computer, for instance, can determine that the load at a certain point of the box is sufficient and move the dumper a required distance forward or send it to empty its load.

Figure 2:
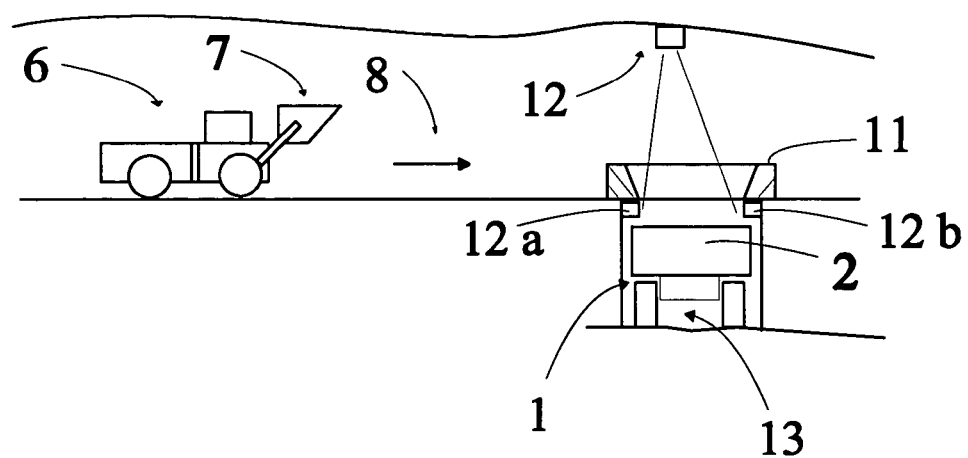
FIG. 2 is a schematic representation of a preferred embodiment of the invention as seen from behind a dumper.

FIG. 2 is a schematic representation of the loading situation of a preferred embodiment of the invention as seen from the back of the dumper. In this case, the position of the dumper in the loading situation is in elevation clearly lower than the position of the loader, in which case the dumper can even be completely below the travelling level of the loader as shown in the figure. In this situation, loading takes place in principle in exactly the same way as in FIG. 1, but the load falls further down. In this embodiment, there may be a downwards-convergent guide edge 11, shown in cross-section in the figure, located above the loading site of the dumper and at the location of the dump box and extending to the inside of the dumper 1 box 2 edges so that all material falls on the dump box. This detail is shown in FIG. 3 in a corresponding manner to FIG. 1 from the top.

This embodiment also shows above the loading point a measuring device 12 that is used to define the height and possibly also the shape of the load on the dump box 2 at the loading point. The measuring device 12 can be a laser scanner, video camera or another suitable measuring device for monitoring the load on the box, especially its height and possibly also its shape. This load definition can also be used to guide the loader in such a manner that its stopping point in the transverse direction of the box 2 can change according to the manner in which the load has settled on the box after earlier bucketfuls. In principle, it is possible to use any suitable stopping point in the direction of travel of the loader and it is not necessary to limit it to the stopping points shown by lines 9a and 9b in FIG. 1. Especially when using a loader that runs automatically controlled by a computer, controlling the loading process by means of the measuring device 12 is easy and reliable, and the dump box can this way be loaded in such a manner that as large an amount of broken rock as possible can be transported each time. The figure also shows two other measuring devices 12a and 12b that are located under the cover of the guide edge 11 so that they can measure the height and/or shape of the load in transverse direction.

In addition to measuring the height, shape and location of the load, the load of the dumper can also be measured with other, different measuring means. Strain gauges or other gauges mounted on the body of the dumper can be used for this purpose to define by direct measurement the weight of the load on the dump box and preferably also its location on the box. The use of such gauges and measuring means indicating measuring values, which are directly proportional to weight, are generally known per se and they are commercially generally available, which is why they need not be described in more detail herein.

Figure 3:
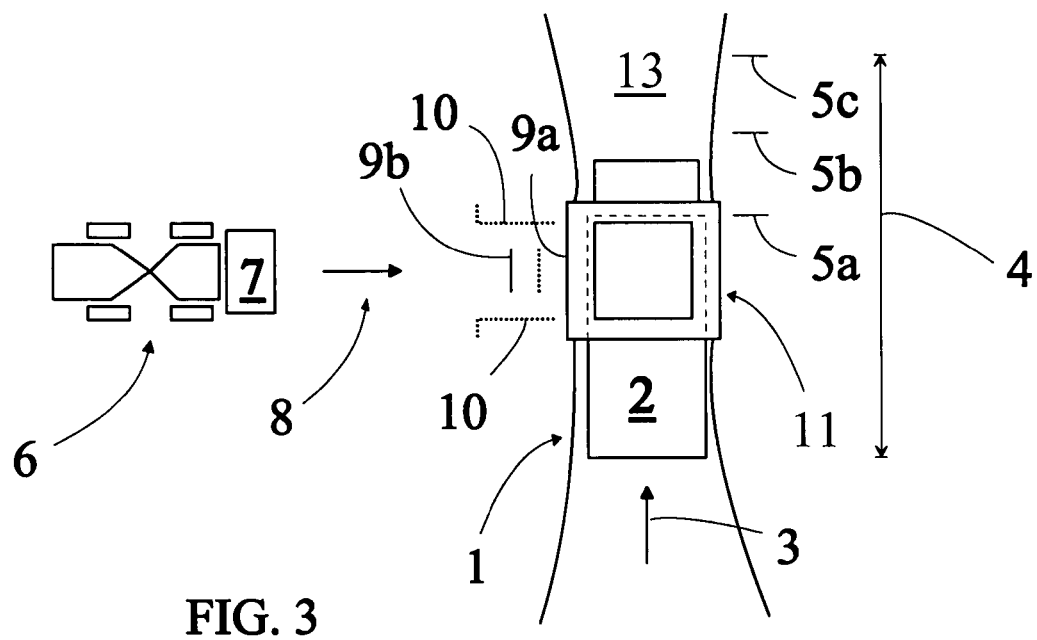
FIG. 3 is a schematic top view of the preferred embodiment of FIG. 2 shown in the same way as in FIG. 1.

FIG. 3 shows a solution corresponding to FIG. 2 from the top, in which case it shows how the guide edge 11 extends inside the edges of the dump box marked with a dashed line and guides in both transverse and longitudinal direction the rock pieces, which possibly fall from the loader bucket to a wider area, to the desired area on the box. The opening of the guide edge 11 is of course approximately equal in width to the loader bucket or longer than it in the direction of the dump box so as to permit the broken rock to fall as easily as possible onto the box. The guide edge 11 is mainly needed to guide blocks that accidentally fall outside the normal emptying area onto the box.

Figure 4:
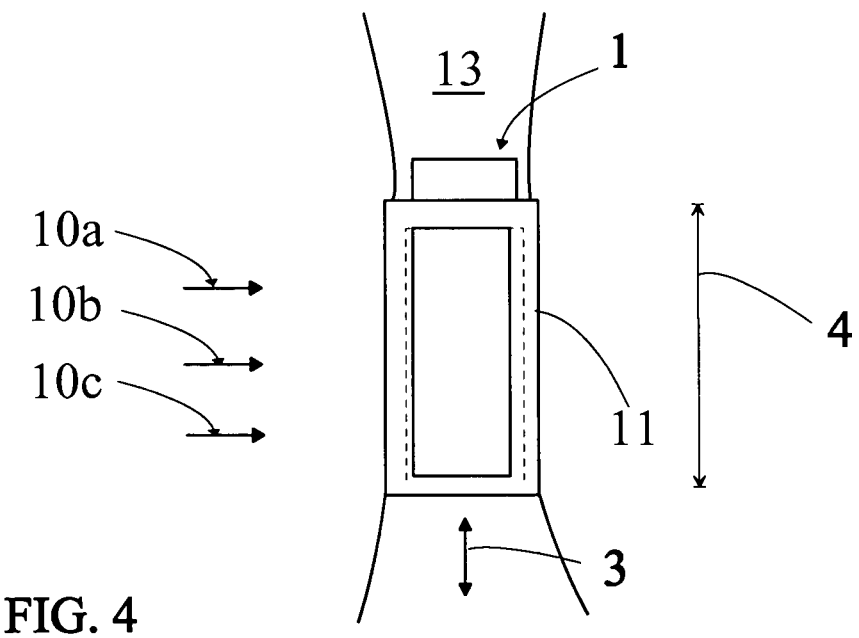
FIG. 4 is a schematic representation of an embodiment of the invention, in which the emptying area of the loader is changed according to the load situation of the dump box.

The invention can also be applied in another manner as shown in FIG. 4, in which measuring means are used to define the position of the dumper and the operation of the loader is guided on the basis of the thus defined dumper position. The loading area or site is then not fixed as in the embodiments described above. In this embodiment, when the dumper arrives at the loading area, i.e. inside certain predefined limits, it stops. As a result of this, measuring means automatically measure what the dumper position is in the area in relation to the measuring means. When the loader brings a load to the dumper, a control signal is transmitted to an apparatus in it to guide the loader along a suitable path in relation to the dumper in the transverse and longitudinal direction of the dumper as appropriate for the loading situation. If the loader is fully controlled by a computer, the computer runs the loader and no actual display is needed for the operator. Loading can then also be done in such a manner that it is not necessary to move the dumper in its longitudinal direction, but the computer guides the route of the loader as shown by arrows 10a to 10c to be suitable with respect to the longitudinal direction of the dumper on the basis of the amount and location of the broken rock already loaded onto the dump box. In this embodiment, the emptying area of the loader is defined in the longitudinal direction of the dumper, i.e. the area is moved to the side of the dumper according to the loading situation, and the loader drives to each emptying area according to the control commands. This solution can also be applied to embodiments having a separate different-level loading site for the dumper and an edge guiding the rock. In this situation, it is, however, possible to use a guide edge having a funnel opening substantially equal to the size of the dump box.

To ensure an even distribution of the load, it is also possible to measure the weight of the load. In such a case, not only is the location and shape/height of the load on the box measured, but also the weight distribution of the load on the box is determined. For instance, if the broken rock being loaded is very heterogeneous containing blocks of different sizes, measuring the shape of the load only may lead to an uneven weight distribution on the box. This in turn may lead to a malfunction in the dumper at least over a long period of time. Thus, weight measurement can prevent uneven loads and consequently ensure correct operation of the equipment.

The invention is in the above description and in the drawings described by way of example only and it is in no way limited to them. An essential point is that loading in the longitudinal direction of the dumper is controlled by moving the dumper in a suitable manner for loading, most preferably automatically, in the longitudinal direction of the dumper, or by moving the emptying area of the loader in the longitudinal direction of the dumper so that the rock loads transported by one or more loaders settle as evenly as possible on the box of the dumper. Further, another essential point is that during the transverse-direction loading of the dump box the loader is guided in the transverse direction of the dumper, i.e. its direction of travel is guided, most preferably automatically so that the rock transported by the loaders can also be loaded as evenly as possible in the transverse direction of the box, resulting in a most suitable loading of the box. Loading is preferably done as automatically as possible so that at least the emptying of the loader bucket is automatically controlled by control means, but if possible, the entire operation, from the loader fetching the material to the movement of the loader between the loading site and the emptying area and the emptying of the bucket, is automated under the control of control means. Correspondingly, the movement of the dumper at its loading site, the movement of the dumper between the loading site and the unloading site, and the unloading of the dumper can most preferably be fully automated under the control of control means. The control means correspondingly preferably comprise at least means for emptying the bucket of the loader and for guiding the loader at least in the emptying area automatically, means for guiding the movement of the loader automatically to fetch the material from a predefined site, to guide the loader to move automatically between its loading site and the emptying area, and to empty the material in the bucket automatically to the dumper. Further, the control means preferably comprise means for guiding the dumper to move automatically between the loading area and unloading site, to unload automatically at the unloading site, and to automatically guide the movement of the dumper in the loading area.

The measuring device of the load can, as shown in FIG. 2, be above the loading area or one or more measuring devices can be mounted below the guide edge 11, for instance, or obliquely in front or after it in the longitudinal direction of the loader. Two or more measuring devices can naturally be used instead of just one, when it is necessary for the measurement. By using the measuring device 12 or the information obtained from it, it is possible to detect by means of comparison data programmed in advance in the computer when the load on the box at a given location is appropriate, and on the basis of this to guide both the dumper and the loader during loading. Two- or three-dimensional measurements, which are generally known per se, can be used to determine the height of the load and possibly also its shape. The measuring devices also help to ensure the safety of the entire operation. Thus, it is possible to detect with the measuring devices the presence of the dumper on the loading site and its correct location before the loader is permitted to empty its bucket. If the dumper is not there or its location is not correct, this is indicated to the loader by transmitting a suitable control signal that prevents the loader from emptying its bucket. This is an especially useful embodiment when using an either fully automated loader or both an automated loader and dumper.

The invention claimed is:

1. An apparatus for loading a dumper with material automatically, comprising:
a controller for guiding the dumper at least during loading;
means controlled by the controller for selecting at least two predetermined loading sites in relation to a loading area, for stopping the dumper in the loading area at a first predetermined loading site so that material transported by a loader can be emptied in an emptying area onto a dump box in a first area along a length of the dumper and for moving at least one of the dumper and the loader to at least a second predetermined loading site so that the loader can empty material onto another area of the dump box; and the controller including means for automatically guiding the loader in the emptying area to a suitable emptying point for loading the dumper and for automatically guiding the movement of the dumper in the loading area or for automatically guiding the loader in the emptying area to a suitable point for loading the dumper, wherein at least the first and second predetermined loading sites are selected prior to the dumper or loader arriving in the loading area.

2. An apparatus as claimed in claim 1, comprising at least one measuring device for measuring a height of a load on the dump box and for controlling the loading based on the measured load height.

3. An apparatus as claimed in claim 1, comprising at least one measuring device for measuring a shape of the load on the dump box and for controlling the loading based the measured load shape.

4. An apparatus as claimed in claim 1, comprising at least one measuring device arranged to detect a presence of the dumper and a location of the dumper in the loading area before the loader is permitted to empty a bucket of the loader.

5. An apparatus as claimed in claim 1, comprising a measuring device for measuring a weight and a location of the load on the dump box and for controlling the loading based on the weight and the location of the load.

6. An apparatus as claimed in claim 1, wherein the controller is adapted to automatically guiding the loader in a transverse direction of the dumper.

7. An apparatus as claimed in claim 1, wherein the controller is adapted to automatically move the dumper in the longitudinal direction.

8. An apparatus as claimed in claim 1, wherein the controller is adapted to move the emptying area of the loader in the longitudinal direction of the dumper according to at least one load parameter and to automatically guide the loader to the emptying area.

9. An apparatus as claimed in claim 1, wherein the controller is adapted to guide the dumper to automatically move between the loading area and an unloading area of the dumper and to automatically empty the load in the unloading area.

* * * * *